US009946762B2

(12) United States Patent
Allen et al.

(10) Patent No.: US 9,946,762 B2
(45) Date of Patent: Apr. 17, 2018

(54) BUILDING A DOMAIN KNOWLEDGE AND TERM IDENTITY USING CROWD SOURCING

(71) Applicant: International Business Machines Corporation, Armonk, NY (US)

(72) Inventors: Corville O. Allen, Morrisville, NC (US); Albert A. Chung, Cary, NC (US); Andrew R. Freed, Cary, NC (US); Dorian B. Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 574 days.

(21) Appl. No.: 14/487,875

(22) Filed: Sep. 16, 2014

(65) Prior Publication Data

US 2016/0078341 A1 Mar. 17, 2016

(51) Int. Cl.
| | | |
|---|---|---|
| *G06F 17/00* | (2006.01) | |
| *G06N 5/00* | (2006.01) | |
| *G06F 17/30* | (2006.01) | |
| *G06N 5/02* | (2006.01) | |
| *G06F 17/27* | (2006.01) | |

(52) U.S. Cl.
CPC ...... *G06F 17/3053* (2013.01); *G06F 17/2735* (2013.01); *G06F 17/30654* (2013.01); *G06F 17/30684* (2013.01); *G06F 17/30864* (2013.01); *G06F 17/30867* (2013.01); *G06N 5/022* (2013.01)

(58) Field of Classification Search
CPC ................................. G06N 5/00; G06N 17/00
See application file for complete search history.

(56) References Cited

U.S. PATENT DOCUMENTS

| | | | |
|---|---|---|---|
| 8,275,306 | B2 | 9/2012 | Attali |
| 8,712,944 | B1 | 4/2014 | Kim |
| 9,245,227 | B2 | 1/2016 | Tabrizi et al. |
| 2006/0294037 | A1 | 12/2006 | Horvitz et al. |
| 2011/0208687 | A1 | 8/2011 | Dube et al. |
| 2011/0313757 | A1* | 12/2011 | Hoover .............. G06F 17/274 |
| | | | 704/9 |

(Continued)

FOREIGN PATENT DOCUMENTS

WO 2011155736 12/2011

OTHER PUBLICATIONS

Allen et al., "Building a Domain Knowledge and Term Identity Using Crowd Sourcing," U.S. Appl. No. 14/640,756, filed Mar. 6, 2015, 32 pages.

Primary Examiner — Christian Chace
Assistant Examiner — Peter Coughlan
(74) Attorney, Agent, or Firm — VanLeeuwen & VanLeeuwen; Diana R. Gerhardt

(57) ABSTRACT

An approach is provided in which a QA system ingests traditional sources, which includes traditional terms, into a domain dictionary. Next, the QA system ingests crowd-based sources that include crowd-based terms and corresponding crowd-based metadata. In turn, the QA system calculates weightings pertaining to the traditional terms based upon the crowd-based metadata. When the QA system receives a question from a requestor that includes question terms, the QA system identifies an answer to the question based on the calculated weightings pertaining to the traditional terms that are relevant to the question terms.

11 Claims, 7 Drawing Sheets

(56) References Cited

U.S. PATENT DOCUMENTS

| | | | |
|---|---|---|---|
| 2012/0124027 A1* | 5/2012 | Hnatio | G06F 19/3493 |
| | | | 707/709 |
| 2013/0132308 A1 | 5/2013 | Boss et al. | |
| 2013/0246328 A1 | 9/2013 | Sweeney et al. | |
| 2014/0129570 A1* | 5/2014 | Johnson | H04N 21/4126 |
| | | | 707/748 |
| 2014/0164893 A1* | 6/2014 | Pariente | G06F 17/30896 |
| | | | 715/207 |

* cited by examiner

BUILDING A DOMAIN KNOWLEDGE AND TERM IDENTITY USING CROWD SOURCING

BACKGROUND

A Question/Answer (QA) system answers questions posed in a natural language format by applying advanced natural language processing, information retrieval, knowledge representation, automated reasoning, and machine learning technologies. QA systems differ from typical document search technologies because document search technologies return a list of documents ranked in order of relevance to a word query, whereas QA systems receives a question expressed in a natural language, seeks to understand the question in much greater detail, and returns a precise answer to the question.

System developers may train QA systems to specific domains to provide more relevant answers to domain-specific questions (e.g., financial domain, travel domain, etc.). Training a QA system for a new domain, however, is time consuming. One approach to training a QA system is for a set of experts in a field to input detailed domain training knowledge into the QA system. Another approach to training a QA system is to capture corpora from trusted, traditional sources (textbooks, journals) that include accurate information. These traditional sources, however, have time-dated information due to their publication frequency. For example, most publishers publish textbooks every few years and publish journals on a monthly or quarterly basis. As such, QA systems trained from traditional sources may not return an up-to-date answer for a given question.

BRIEF SUMMARY

According to one embodiment of the present disclosure, an approach is provided in which a QA system ingests traditional sources, which includes traditional terms, into a domain dictionary. Next, the QA system ingests crowd-based sources that include crowd-based terms and corresponding crowd-based metadata. In turn, the QA system calculates weightings pertaining to the traditional terms based upon the crowd-based metadata. When the QA system receives a question from a requestor that includes question terms, the QA system identifies an answer to the question based on the calculated weightings pertaining to the traditional terms that are relevant to the question terms.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
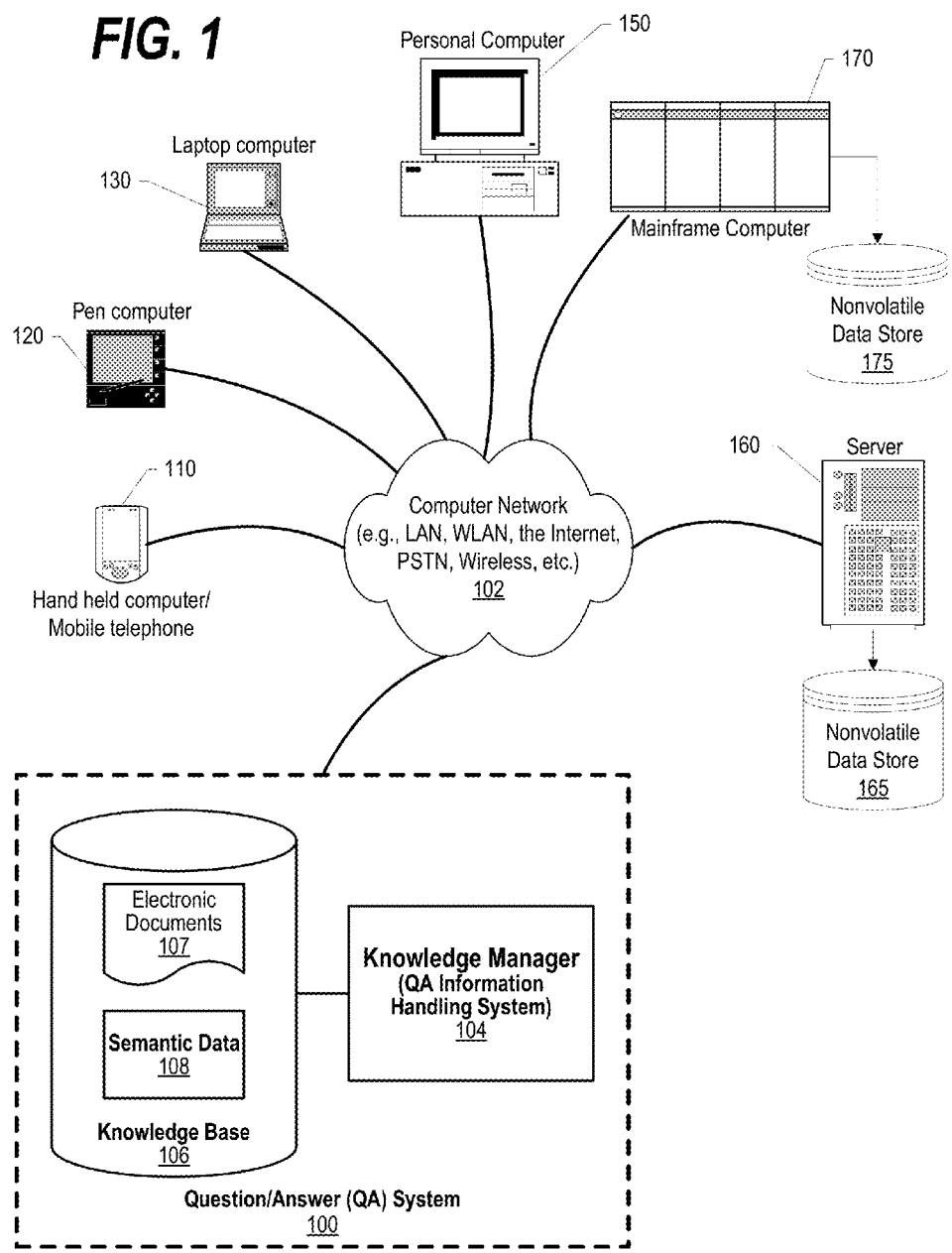
FIG. 1 depicts a schematic diagram of one illustrative embodiment of a question/answer creation (QA) system in a computer network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
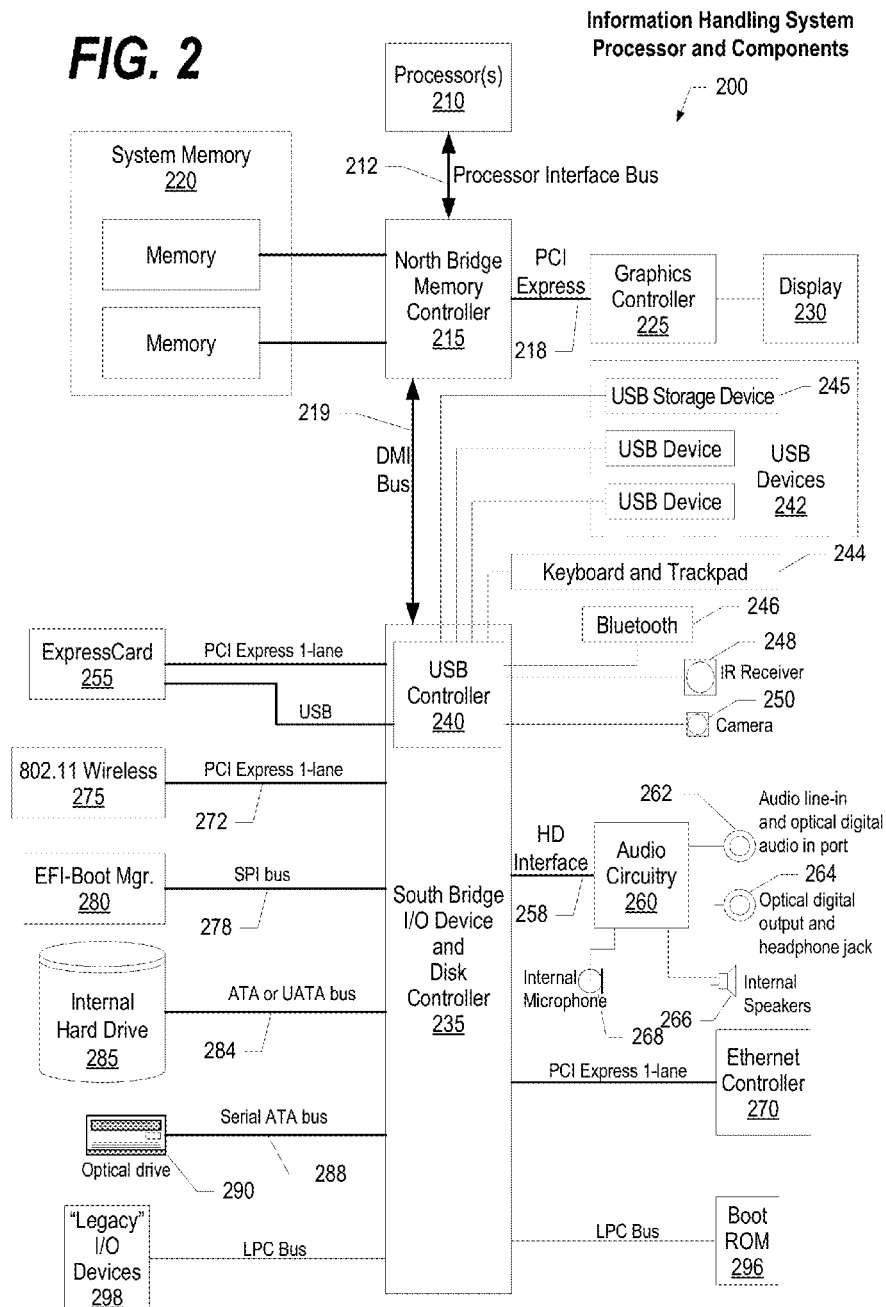
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-8 depict an approach that can be executed on an information handling system that enhances a traditional source domain dictionary using crowd-based metadata. In one embodiment, a QA system augments, influences, and defines traditional source domain terms based on crowd-based metadata and crowd information related to the terms. The QA system gravitates the definitions of the terms to the most crowd influenced value based on the crowd based metadata such as "likes," "follows," "tags," "tag-weights," strength of relevance of users, branches from the topic, sentiment, and sentiment level metadata. In another embodiment, the QA system treats real-time loading of small length crowd-based information (e.g., news feeds) as highly relevant corpora to provide real-time, up-to-date answers to questions. In addition, topics or questions deemed opinionated carry more influence by society and, as such, answers to these questions gravitate to a crowd-based opinion for the majority or most relevant agreeable majority rule.

Figure 3:
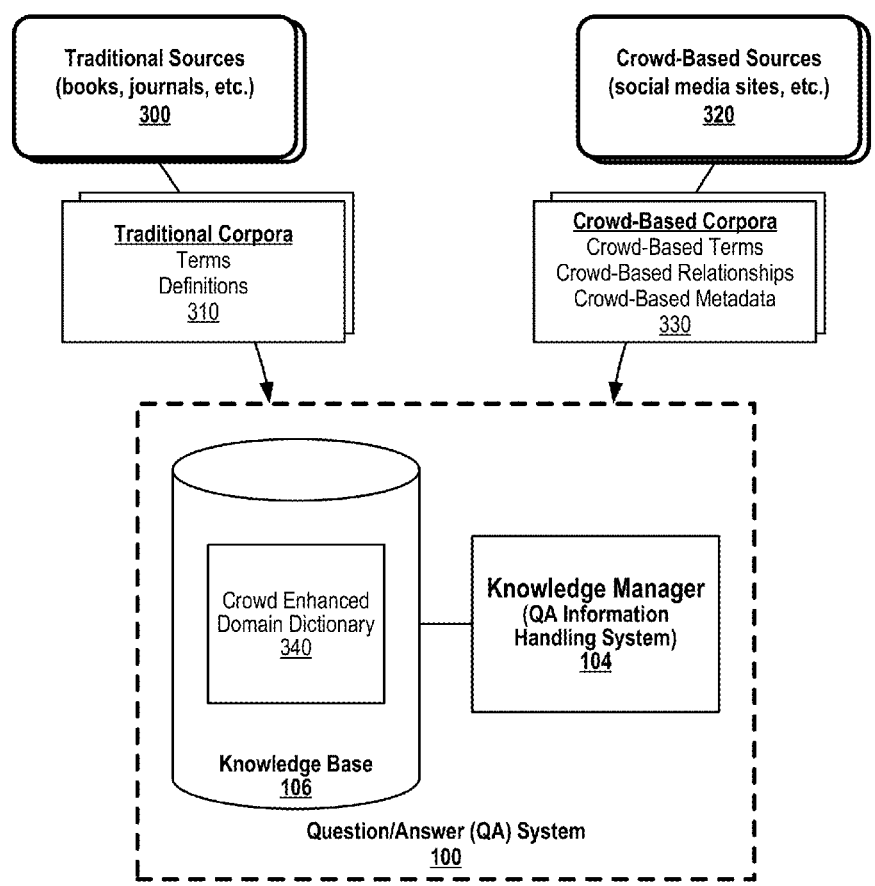
FIG. 3 is an exemplary diagram depicting a question/answer system that enhances a traditional domain dictionary based upon crowd-based metadata from crowd-based sources.

FIG. 3 is an exemplary diagram depicting a question/answer system that enhances a traditional domain dictionary based upon crowd-based metadata ingested from crowd-based sources. QA system 100 ingests traditional corpora 310 from traditional sources 300. Traditional sources may be books, journals, and other "non-real-time" sources of information. As such, traditional corpora 310 inherently include time-dated information. QA system 100 compares traditional corpora 310 against nominal frequency use of words to identify domain specific terms and definitions to create a candidate "traditional source domain dictionary." For example, a nominal frequency use of the term "fiscal" may appear once every 200 words in common documents but appears once every 50 words in traditional corpora 310. In this example, QA system 100 determines that "fiscal" is a domain specific term for the domain in which QA system 100 is training (e.g., a Finance domain, see FIG. 4 and corresponding text for further details).

QA system 100 ingests crowd-based corpora 330 from crowd-based sources 320 that have real-time information. For example, crowd-based sources 320 may be news feeds, blogs, web sites, forums, and social media sites. In one embodiment, QA system 100 ingests crowd-based corpora 330 as terms linked to associated crowd-based metadata, such as a number of replies, a number of likes, and tags or keywords.

QA system 100 uses crowd-based corpora 330 to influence current understanding and context of traditional corpora 310's terms to create crowd enhanced domain dictionary 340 in knowledge base 106. When QA system 100 matches a crowd-based term to a traditional term, QA system 100 checks the traditional term's definitions and relationships against crowd-based corpora 330 for similar definitions and relationships. QA system 100 further processes and weighs the identified definitions and relationships that cross each source using the crowd-based metadata included in crowd-based corpora 330.

In one embodiment, QA system 100 may add new terms and definitions to crowd enhanced domain dictionary 340 from crowd-based corpora 330 that are not included in traditional corpora 310. For example, the term "fiscal cliff" may be included in crowd-based corpora 330 but is not included in traditional corpora 310 because the term was not prevalent when traditional sources 300 was published (see FIG. 4 and corresponding text for further details).

Figure 4:
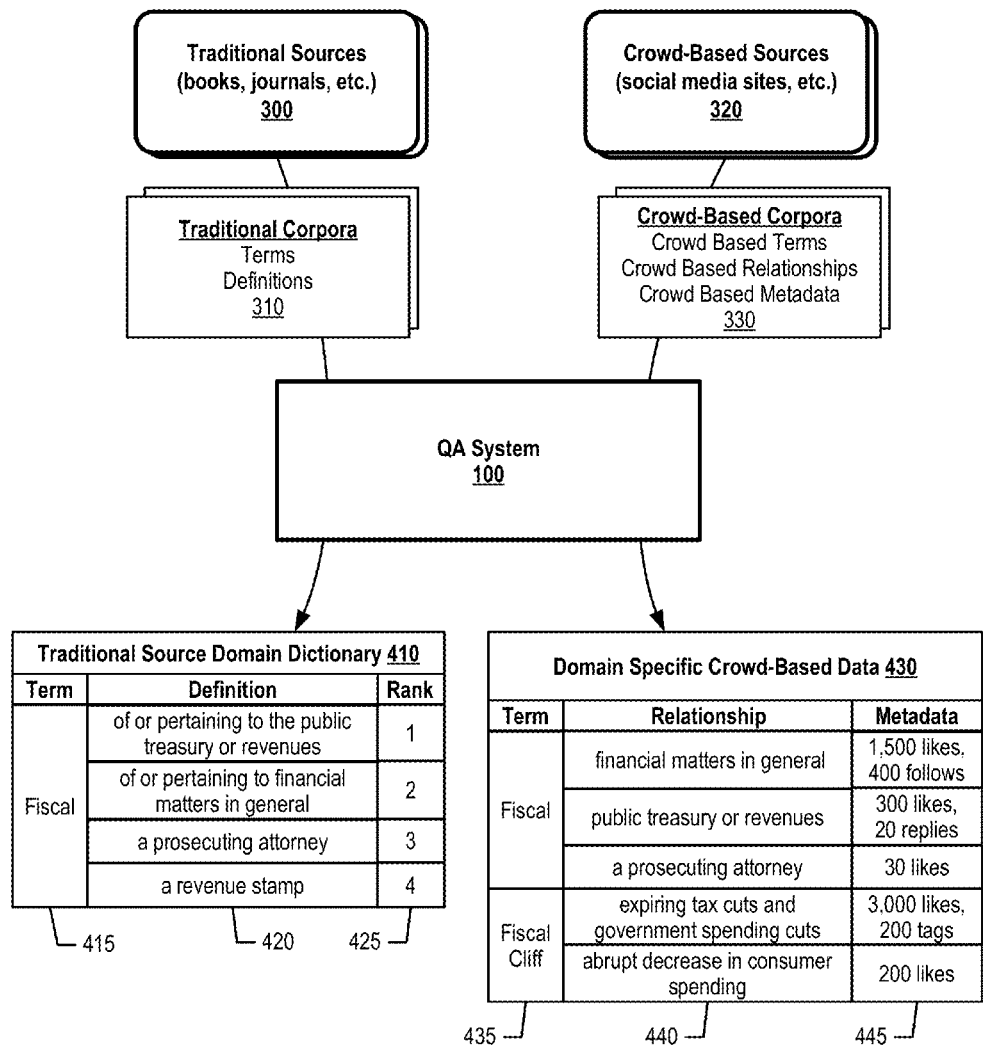
FIG. 4 is an exemplary diagram depicting a word frequency analyzer identifying domain-specific terms in traditional corpora and crowd-based corpora.

FIG. 4 is an exemplary diagram depicting a QA system that identifies domain-specific terms found in traditional corpora and crowd-based corpora. QA system 100 compares traditional corpora 310's terms against nominal word frequencies to identify traditional domain specific terms. For example, QA system 100 may analyze common documents to determine word usage frequencies and compare the word usage frequencies against terms included in traditional corpora 310. For example, QA system 100 may determine that the term "fiscal" is used once every 200 words in common documents, but "fiscal" is used once every 50 words in traditional corpora 310. As such, word frequency analyzer 400 adds the term "Fiscal" to traditional source domain dictionary 410 in column 415. When QA system 100 identifies a domain specific term, word frequency analyzer also stores the term's definitions (column 420) and rankings (column 425) based upon information included in traditional corpora 310.

Likewise, QA system 100 compares crowd-based terms in crowd-based corpora 330 against nominal word frequencies to identify domain specific crowd-based terms. When QA system 100 identifies a domain specific crowd-based term, QA system 100 stores the terms, relationships, and metadata in domain specific crowd-based data 430. FIG. 4 shows that the term "Fiscal" and "Fiscal Cliff" (column 435) are identified as domain specific crowd-based terms from crowd-based corpora 330. QA system 100 identified three relationships to the term "fiscal" shown in column 440. In addition, QA system 100 extracted metadata for the three different terms shown in column 445.

In addition, QA system 100 detected that "fiscal cliff" has two relationships and corresponding metadata, which are stored in columns 440 and 445, respectively. QA system 100, in turn, evaluates traditional source domain dictionary 410 against domain specific crowd-based data 430 to adjust definition rankings in column 425 and augment traditional source domain dictionary 410 with new words and relationships (see FIG. 5 and corresponding text for further details).

Figure 5:
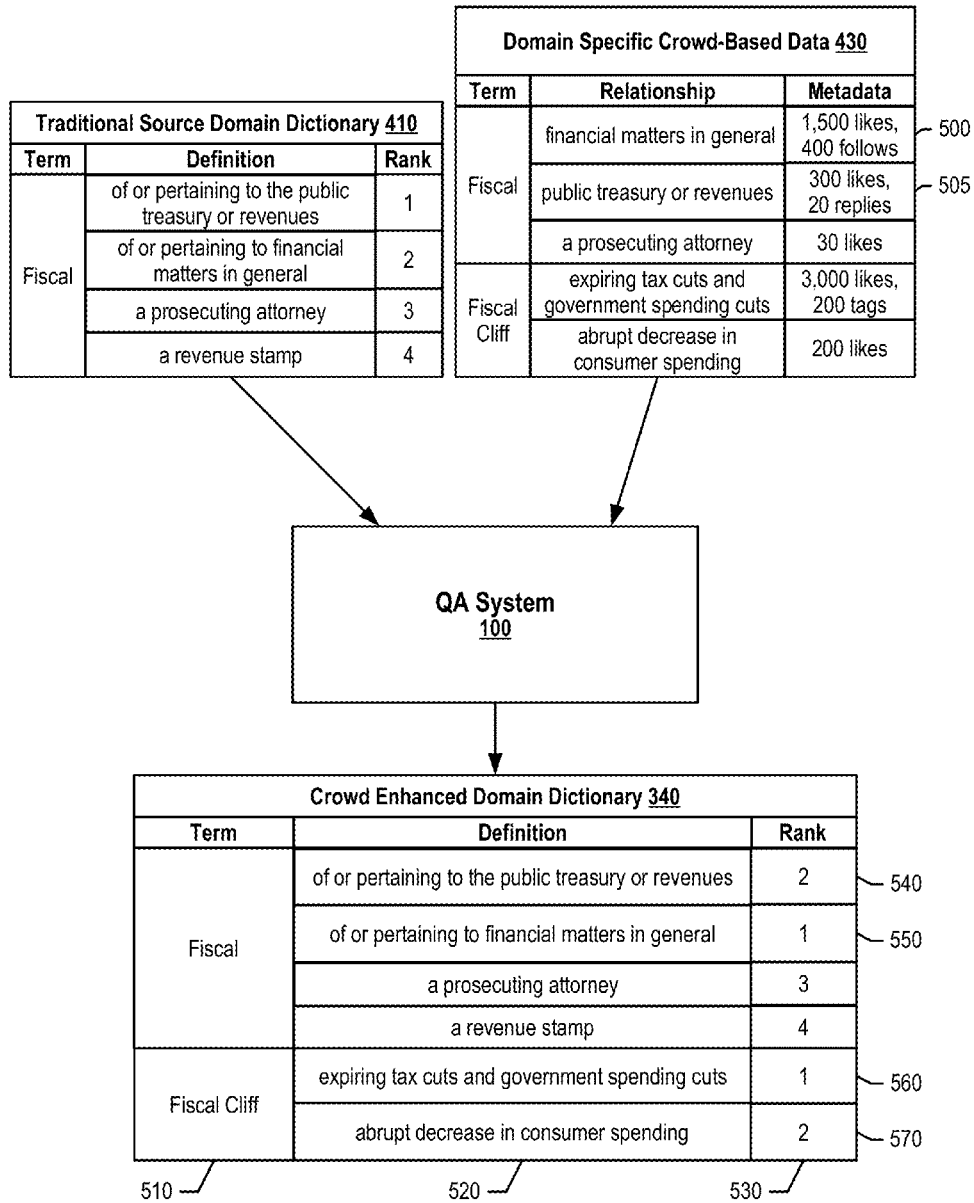
FIG. 5 is an exemplary diagram depicting a knowledge manager adjusting weightings of traditional definitions based upon crowd-based metadata from crowd-based sources.

FIG. 5 is an exemplary diagram depicting a QA system that enhances a traditional source domain dictionary using crowd-based metadata. QA system 100 evaluates traditional source domain dictionary 410 against domain specific crowd-based data 430 and augments, influences, and defines traditional source domain terms based on crowd-based metadata and crowd information related to the terms.

When QA system 100 identifies a crowd-based term included in domain specific crowd-based data 430 that matches a traditional term from traditional source domain dictionary 410, QA system 100 pulls the term's traditional definition(s) and relationships compares them against the crowd-based data for similar definitions and relationships. The identified definitions and relationships that cross each source type (traditional source and crowd-based source) are further processed using the crowd-based metadata to generate crowd enhanced domain dictionary 340.

Crowd enhanced domain dictionary 340 includes "fiscal" in column 510 from traditional source domain dictionary 410. However, QA system 100 adjusted the definition rankings of "fiscal" according to crowd-based definition rankings that are based upon the crowd-based metadata included in rows 500 and 505 of domain specific crowd-based data 430. As can be seen, the definition in row 550, which was ranked $2^{nd}$ in traditional source domain dictionary 410, is now ranked $1^{st}$ due QA system 100 associating the definition to row 500's definition in domain specific crowd-based data 430, which has the most amount of metadata for "fiscal." Likewise, QA system 100 associated row 540's definition to the definition in row 505, which has less favorable metadata.

QA system 100 also added the term "fiscal cliff" in column 510 from domain specific crowd-based data 430, which is not included in traditional source domain dictionary 410. QA system 100 added fiscal cliff's two definitions in column 520 and ranked them accordingly in column 530 based upon the crowd-based metadata included in domain specific crowd-based data 430. The definition in row 560 is ranked $1^{st}$ because the definition has 3,000 likes and 200 tags (from domain specific crowd-based data 430) compared with row 570's definition of 200 likes (domain specific crowd-based data 430). As a result, crowd enhanced domain diction 340 includes rankings influenced by real-time information, new terms, and new definitions based upon domain specific crowd-based data 430.

Figure 6:
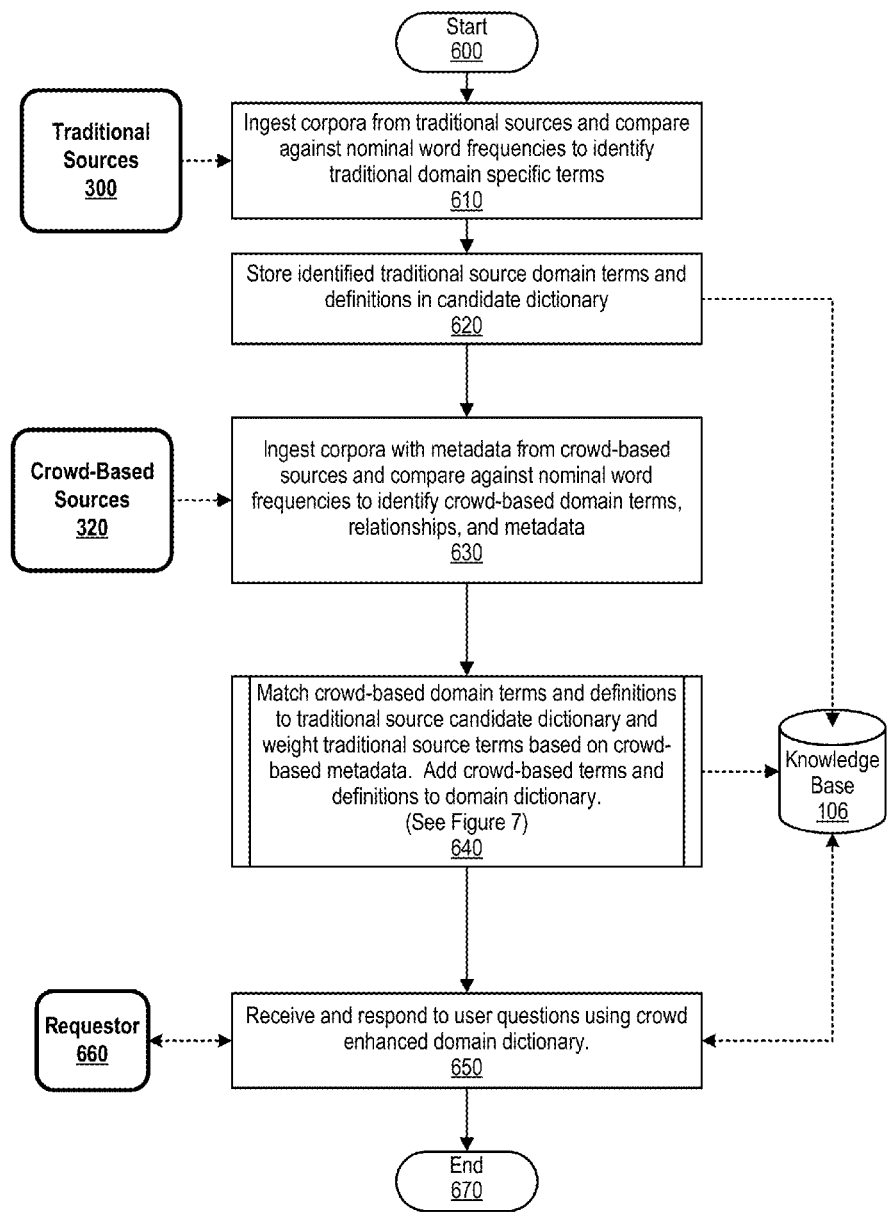
FIG. 6 is an exemplary flowchart showing steps by a question/answer system to ingest traditional corpora into a domain dictionary and enhance the domain dictionary based upon crowd-based metadata.

FIG. 6 is an exemplary flowchart showing steps by a question/answer system to ingest traditional corpora into a domain dictionary and enhance the domain dictionary based upon crowd-based metadata. Processing commences at 600, whereupon at step 610, the process ingests corpora from traditional sources 300 and compares the traditional corpora against nominal word frequencies to identify traditional domain specific terms. For example, the QA system may be training for an "Economics" domain and ingests corpora from economics books and journals. in this example, the QA system identifies economic terms in the economics books and journals that are utilized more often when compared against common documents such as newspapers, novels, etc. At step 620, the process stores the identified traditional source domain terms and definitions in a domain dictionary located in knowledge base 106.

The process, at step 630 ingests crowd-based corpora with crowd-based metadata from crowd-based sources, and compares the crowd-based corpora against nominal word frequencies to identify crowd-based domain terms, relationships, and metadata. Continuing from the example above, the QA system may ingest information from a financial newsfeed and identify terms that the QA system utilizes more often when compared against common documents.

Figure 7:
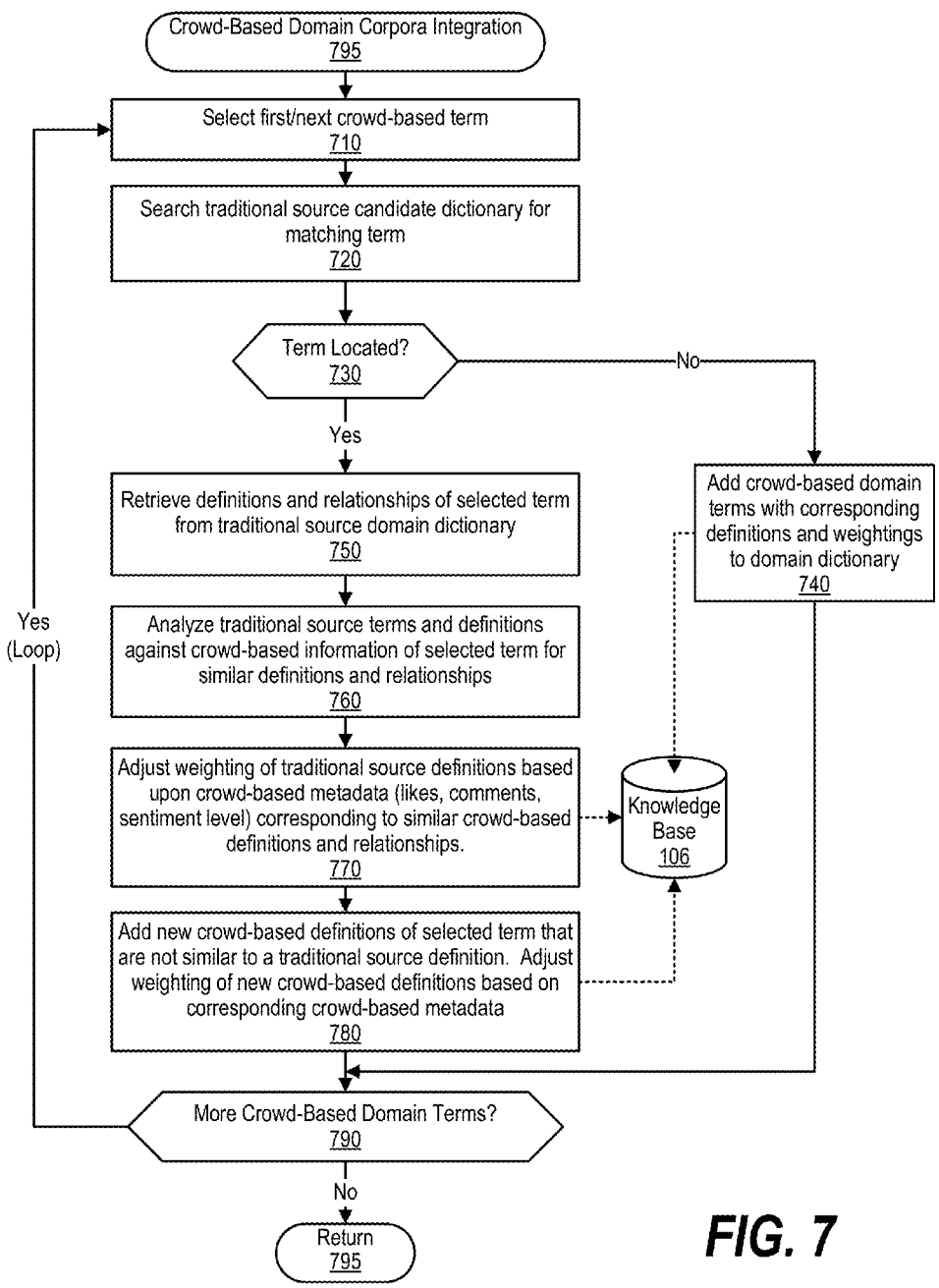
FIG. 7 is an exemplary flowchart showing steps by a question/answer system to match traditional terms to crowd-based terms and adjust weightings on the traditional definitions based upon corresponding crowd-based metadata.

At predefined process 640, the process matches crowd-based domain terms and definitions to traditional source candidate dictionary terms and weighs the traditional source terms based on the crowd-based metadata (see FIG. 7 and corresponding text for processing details). In addition, the process augments the domain dictionary by adding unique crowd-based terms and definitions. Continuing with the example above, the QA system may determine that the term "social return on investment" is a crowd-based term that does not match a traditional term. As such, the QA system adds "social return on investment" and corresponding definitions to the domain dictionary.

At this point, the QA system is ready to provide time sensitive answers to domain specific questions. As such, at step 650, the process receives a question from requestor 660 that includes question terms. The process evaluates the question terms against the terms and weightings included in crowd enhanced domain dictionary to provide an answer to requestor 660. Processing thereafter ends at 670.

FIG. 7 is an exemplary flowchart showing steps by a question/answer system to augment, influence, and define traditional source domain terms based on crowd-based metadata and crowd-based information. Processing commences at 700, whereupon at step 710, the process selects a first crowd-based term from domain specific crowd-based data, which is crowd-based corpora that the process filters to a specific domain (see FIG. 4 and corresponding text for further details).

At step 720, the process searches the traditional source domain dictionary for a term that matches the selected crowd-based term (e.g., "fiscal"). The process determines as to whether the traditional source domain dictionary includes a matching traditional term (decision 730). If the traditional source domain dictionary does not include a matching term, then decision 730 branches to the 'no' branch. At step 740, the process adds the selected crowd-based domain term with corresponding definitions and weightings to the domain dictionary located in knowledge base 106 (e.g., "fiscal cliff").

On the other hand, if a matching traditional term is located, then decision 730 branches to the 'yes' branch. At step 750, the process retrieves definitions and relationships of the selected term from traditional source candidate dictionary. At step 760, the process analyzes the traditional source terms and definitions against crowd-based information of the selected term for similar definitions and relationships. At step 770, the process adjusts weighting of the traditional source definitions based upon the crowd-based metadata corresponding to similar crowd-based definitions and relationships (crowd-based definition rankings). For example, the QA system may apply a higher weighting to the definitions of the terms corresponding to the most crowd influenced value based on the crowd-based metadata such as "likes," "follows," "tags," "tag-weights," etc.

At step 780, the process adds new crowd-based definitions of the selected term that are not similar to a traditional source definition. For example, the traditional source domain dictionary may include four definitions for the term "fiscal," and the domain specific crowd-based data may include an additional recent term that the QA system adds to the domain dictionary. The process then adjusts the weightings of new crowd-based definitions based on corresponding crowd-based metadata.

The process determines as to whether there are more crowd-based domain terms to evaluate against traditional terms (decision 790). If there are more crowd-based domain terms to evaluate, then decision 790 branches to the 'yes' branch to select and process the next crowd-based term. This looping continues until there are no more crowd-based terms to process, at which point decision 790 branches to the "no" branch. FIG. 7 processing thereafter returns to the calling routine (see FIG. 6) at 795.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. An information handling system comprising:
   one or more processors;
   a memory coupled to at least one of the processors; and
   a set of computer program instructions stored in the memory and executed by at least one of the processors in order to perform actions of:
      ingesting a first set of traditional sources that comprise a plurality of first terms;
      ingesting a second set of crowd-based sources that comprise a plurality of second terms and a plurality of crowd-based metadata;
      calculating one or more weightings pertaining to one or more of the first terms based on the crowd-based metadata, wherein the calculating further comprises:
         matching one or more of the first terms to one or more of the plurality of second terms; and
         applying a plurality of crowd-based definition rankings corresponding to the matched one or more second terms to a plurality of first definitions corresponding to the matched one or more first terms, wherein the plurality of crowd-based definition rankings correspond to the one or more weightings;
      receiving a question that includes one or more question terms; and
      identifying an answer to the question based on one or more of the weightings corresponding to one or more of the first terms that are relevant to one or more of the question terms.

2. The information handling system of claim 1 wherein the one or more processors perform additional actions comprising:
   creating a crowd enhanced domain dictionary that comprises the one or more first terms, the plurality of first definitions, and the plurality of crowd-based definition rankings.

3. The information handling system of claim 2 wherein the one or more processors perform additional actions comprising:
   adding one or more of a plurality of second definitions to the crowd enhanced domain dictionary, wherein the added one or more second definitions do not match one of the plurality of first definitions.

4. The information handling system of claim 2 wherein the one or more processors perform additional actions comprising:

determining that an unmatched one of the one or more second terms does not match one of the one or more first terms;

adding the unmatched second term to the crowd enhanced domain dictionary; and adding one or more different definitions corresponding to the unmatched second term to the crowd enhanced domain dictionary, wherein the one or more different definitions are retrieved from the ingested second set of crowd-based sources.

5. The information handling system of claim 1 wherein:

at least one of the first set of traditional sources is selected from the group consisting of a book, a journal, and a magazine; and at least one of the second set of crowd-based sources is selected from the group consisting of a news feed, a blog, a web site, a forum, and a social media site.

6. The information handling system of claim 1 wherein the crowd-based metadata comprises the one or more numerical accumulations selected from the group consisting of likes, tags, keywords, replies, agreements, disagreements, dislikes, and follows.

7. A computer program product stored in a computer readable storage medium, comprising computer program code that, when executed by an information handling system, causes the information handling system to perform actions comprising:

ingesting a first set of traditional sources that comprise a plurality of first terms;

ingesting a second set of crowd-based sources that comprise a plurality of second terms and a plurality of crowd-based metadata;

calculating one or more weightings pertaining to one or more of the first terms based on the crowd-based metadata, wherein the calculating further comprises:

matching one or more of the first terms to one or more of the plurality of second terms; and applying a plurality of crowd-based definition rankings corresponding to the matched one or more second terms to a plurality of first definitions corresponding to the matched one or more first terms, wherein the plurality of crowd-based definition rankings correspond to the one or more weightings;

receiving a question that includes one or more question terms; and identifying an answer to the question based on one or more of the weightings corresponding to one or more of the first terms that are relevant to one or more of the question terms.

8. The computer program product of claim 7 wherein the information handling system performs additional actions comprising:

creating a crowd enhanced domain dictionary that comprises the one or more first terms, the plurality of first definitions, and the plurality of crowd-based definition rankings.

9. The computer program product of claim 8 wherein the information handling system performs additional actions comprising:

adding one or more of a plurality of second definitions to the crowd enhanced domain dictionary, wherein the added one or more second definitions do not match one of the plurality of first definitions.

10. The computer program product of claim 8 wherein the information handling system performs additional actions comprising:

determining that an unmatched one of the one or more second terms does not match one of the one or more first terms;

adding the unmatched second term to the crowd enhanced domain dictionary; and adding one or more different definitions corresponding to the unmatched second term to the crowd enhanced domain dictionary, wherein the one or more different definitions are retrieved from the ingested second set of crowd-based sources.

11. The computer program product of claim 7 wherein:

at least one of the first set of traditional sources is selected from the group consisting of a book, a journal, and a magazine;

at least one of the second set of crowd-based sources is selected from the group consisting of a news feed, a blog, a web site, a forum, and a social media site; and the crowd-based metadata comprises the one or more numerical accumulations selected from the group consisting of likes, tags, keywords, replies, agreements, disagreements, dislikes, and follows.

\* \* \* \* \*